Oct. 27, 1964  C. L. KLASING, JR  3,154,026
ARTICULATED TIE-DOWN LOAD CONTROL BRACKET
Filed May 14, 1962  2 Sheets-Sheet 1
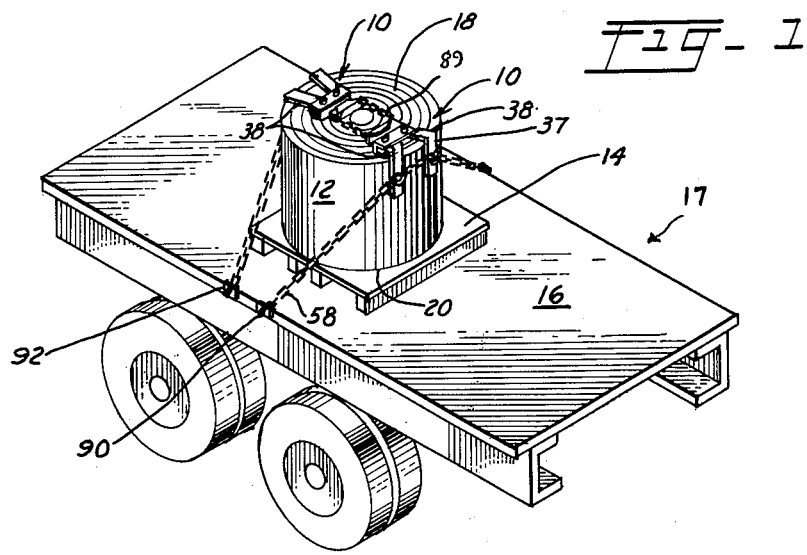
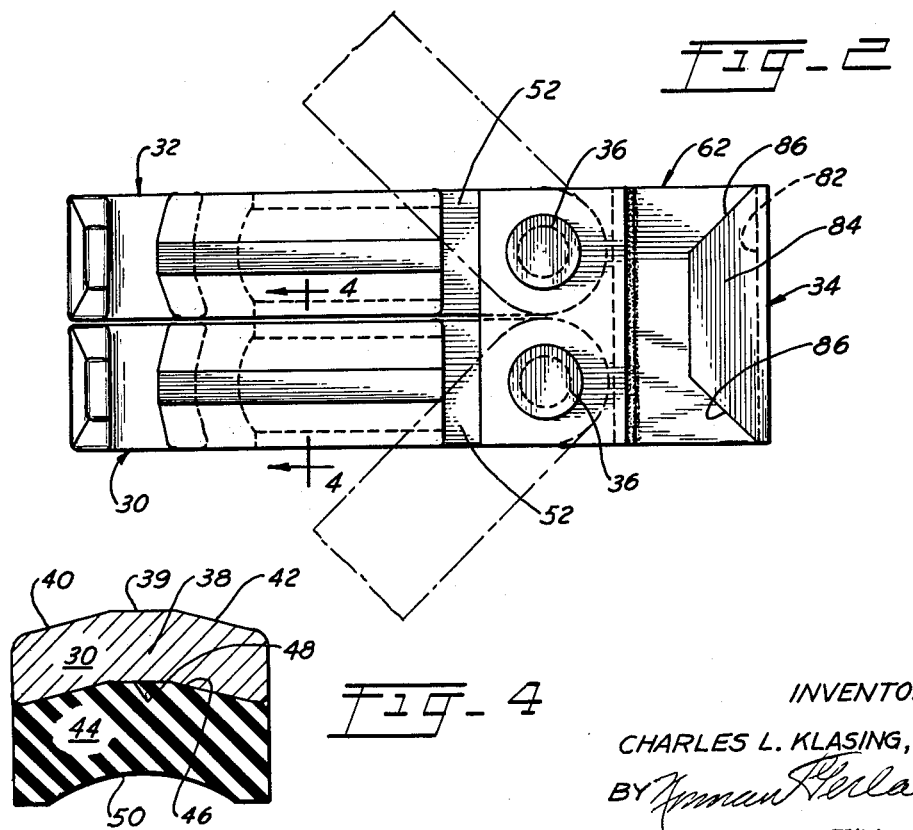
INVENTOR
CHARLES L. KLASING, JR.
BY
ATT'Y.

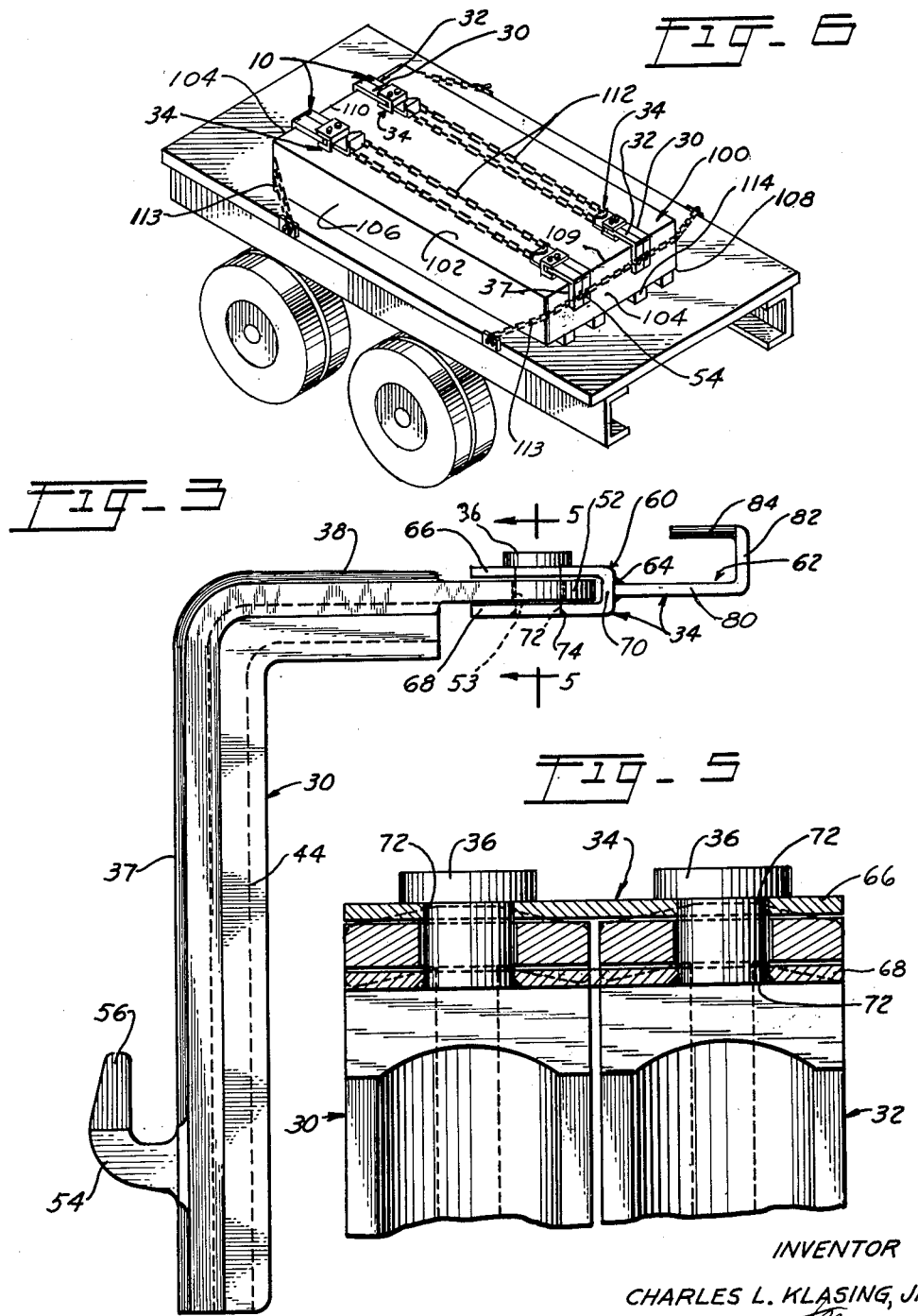

United States Patent Office 3,154,026
Patented Oct. 27, 1964

3,154,026
ARTICULATED TIE-DOWN LOAD CONTROL
BRACKET
Charles L. Klasing, Jr., New Lenox, Ill., assignor to
Klasing Hand Brake Co., Joliet, Ill., a corporation of
Illinois
Filed May 14, 1962, Ser. No. 194,433
5 Claims. (Cl. 105—369)

The present invention relates to a load control device or instrumentality by means of which a relatively massive object or load is held against shifting or lateral displacement on the supporting surface on which it rests during shipment. More specifically, the invention is concerned with an articulated tie-down bracket having means whereby it may be attached to one or more tie-down chains, straps, belts or the like and in which the articulated sections thereof are capable of assuming various positions with respect to one another to the end that the bracket may be applied to loads of varying sizes and shapes.

The improved articulated tie-down load control bracket comprising the present invention has been designed for use primarily in connection with the highway transportation of goods, that is, shipment of the goods on a motor vehicle such as a van-type truck or tractor-drawn trailer. The invention is, however, capable of other uses, and tie-down load control brackets constructed according to the present invention may, if desired, be employed for stabilizing loads which are carried in railway freight cars, ships or aircraft. Irrespective, however, of the particular use to which the present invention may be put, the essential features thereof are at all times preserved.

A common method of stabilizing a load for highway shipment is by the use of tie-down chains which are provided with hooks at the ends thereof, the hooks being designed for attachment to reaction bars or brackets on the sides of the truck or trailer bed. The chains are variously applied to the load, as, for example, by passing them across the front and rear sides of the load, and when necessary, passing them crosswise over the top of the load in an appropriate manner, depending upon the shape and size of the particular load. Looseness in the chains is taken up by suitable tensioning devices, likewise variously applied to the chains or to both the chains and suitable reaction points on the truck or trailer bed.

The present invention is designed as an improvement over such conventional methods of effecting load stabilization and, accordingly, it contemplates the provision of a novel articulated tie-down bracket having movable sections which are capable of being adjusted to fit the shape characteristics of various sizes and shapes of loads, and when applied to a particular load, presents anchoring points which are designed for cooperation with one or more chains, the arrangement being such that the load will be restrained against horizontal sliding movement as well as vertical movement. The bracket thus serving a dual purpose reduces to a minimum the number of chains which may be required for a given load. Still further, the tie-down bracket of the present invention is capable of application to a given load at the most appropriate regions for proper restraint of the load against shifting, selective placement of the bracket on the load being made possible by adjustment of the articulated sections which cooperate to make up the bracket. For example, by adjusting the sections of the bracket, the bracket may be applied to a cylindrical object, such as a sheet metal coil, or to a rectangular object, such as a stack of metal sheets, a slab, or a billet, with equal facility, the application being so made that appropriate chain anchor points are made available for use with a minimum number of chains for securing the load in position.

The provision of a tie-down bracket of the general character and possessing the advantages heretofore briefly outlined being among the principal objects of the invention, a further object is to provide such a bracket having permanently associated therewith "built-in" cushioning means for protecting the load from the damaging action of chain contact, as well as for absorbing shock when accelerating or decelerating forces are involved due to speed or direction changes in the motion of the transporting vehicle. By such an arrangement, the conventional time-consuming expedient of interposing wooden blocks or other cushioning means between the chains and the load is eliminated and loading time is correspondingly shortened.

A still further object of the invention is to provide a tie-down bracket which, when applied to the more common forms or types of load, presents overlying, overhanging and side-engaging reaction surfaces for the load so that when the associated chains are applied to the brackets, the latter presents multi-directional reaction forces instead of the usual unidirectional reaction force which is offered by conventional load-engaging chains. It is because of this feature that a reduction in the number of chains necessary to secure a given load may be obtained.

The provision of a tie-down bracket which is inexpensive to manufacture; one which is rugged and durable and, therefore, will withstand rough usage; and one which otherwise is well-adapted to perform the services required of it, are further desirable features which have been borne in mind in the production and development of the present invention.

In the accompanying two sheets of drawings forming a part of this specification, one illustrative embodiment of the invention and several applications thereof have been shown.

In these drawings:

FIG. 1 is a perspective view showing a highway vehicle having two of the articulated tie-down load control brackets of the present invention operatively applied to a cylindrical load on the load-supporting platform of the vehicle;

FIG. 2 is an enlarged plan view of one of the brackets of FIG. 1;

FIG. 3 is a side elevational view of the bracket of FIG. 2;

FIG. 4 is an enlarged transverse sectional view taken on the line 4—4 of FIG. 2;

FIG. 5 is an enlarged transverse sectional view taken on the line 5—5 of FIG. 3; and FIG. 6 is a perspective view similar to FIG. 1 but showing the brackets operatively applied to a rectangular load instead of a cylindrical load.

Referring now to the drawings in detail, and in particular to FIG. 1, two of the improved articulated tie-down load control brackets 10 have been shown, for exemplary purposes, as being operatively applied to a load 12. The latter is shown as resting on a pallet 14 which, in turn, is supported upon the platform 16 of a transporting vehicle 17. The platform 16 may, for purposes of discussion herein, be considered as being associated with a conventional tractor-drawn trailer, although it may be the platform of a truck, railway freight car or any other vehicle having a load-supporting platform. The load 12, in the selected exemplary environment of the invention shown in FIG. 1, is in the form of an involute sheet metal coil having an over-all cylindrical configuration. The coil is to be shown as being disposed upon the pallet 14 with its axis extending vertically so that one circular end face 18 of the coil is presented upwardly and disposed in a horizontal plane. The other end face 20 of the coil rests squarely upon the pallet 14.

The two articulated tie-down load control brackets 10 are identical in construction and, therefore, a description of one will suffice for both. Each bracket 10 is comprised of three principal parts, namely, a pair of angle legs 30 and 32, and a combined yoke and hook member 34 common to both angle legs. It further includes a pair of pivot pins 36 by means of which the two angle legs are pivotally attached to the combined yoke and hook member 34.

Each angle leg is in the form of an elongated, inverted L-shaped member which is formed of a metal forging or casting and has a vertical portion 37 (see FIG. 3) and a horizontal portion 38. The vertical portion 37 is somewhat longer than the horizontal portion 38. In transverse cross section each portion 37 and 38 is dished as best seen in FIG. 4 so as to provide a medial part 39 and two diverging side parts 40 and 42. Each angle leg is "lined" with a cushioning strip 44 having what may be referred to as a "convex" face 46 which is shaped conformably to the inside or "concave" face 48 of the angle leg. For purposes of description herein, the cross-sectional shape of both the angle leg and its liner may be considered roughly as being of concavo-convexo configuration. The exposed inside face of the cushioning strip 44 is itself concave by reason of a shallow recess 50 which extends the full length of the cushioning strip 44. The cushioning strip 44 is preferably formed of an elastomeric material such as molded rubber and, thus, it possesses an appreciable degree of resiliency and yieldable compressibility. The strip 44 is coextensive with the angle leg to which it is attached. The cushioning strip 44 is permanently affixed to the angle leg in any suitable manner, as, for example, by a vulcanization process or by the use of the suitable adhesive or cement. The free or distal end region of the horizontal portion 38 of each angle leg is provided with an extension in the form of a flat attachment ear 52. The latter is of reduced thickness and has a hole 53 therein by means of which the angle leg as a whole may be pivotally connected to the combined yoke and hook member 34 in a manner that will be described hereafter. The vertical portion 37 of each angle leg is formed with an integral upwardly presented chain-receiving hook 54, the hook being disposed on the outside face of the medial part 39 in the lower regions of the latter. The hook 54 is provided with a hook finger 56 which is spaced from the outside face of the medial part 39 by a distance slightly greater than the small thickness dimension of an individual chain link of a conventional tie-down chain such as one of the chains shown in FIG. 1 at 58, but not as great as the minor elliptical axis of such chain link. The chain may thus be received within the hook confines without endwise slippage taking place, as will become apparent when the operation of the bracket 10 is set forth.

The combined yoke and hook member 34 has a shape which is best illustrated in FIG. 3, and it is in the form of a unitary metal member having a bifurcated yoke portion 60 and a hook portion 62. The member 34 may be formed in two pieces, i.e., the hook portion 62 may be separately formed from the yoke portion 60 and the two separately formed parts welded together as shown at 64. The yoke portion 60 of the member 34 is of U-shape configuration and includes a flat upper part 66 and a flat lower part 68, the two parts being connected together by a bight part 70 to which the hook portion 62 is welded. Two spaced apart pairs of aligned holes 72 are formed in the parts 66 and 68 and are designed for respective reception therethrough of the two aforementioned pivot pins 36. Each pivot pin 36 serves to connect one of the angle legs of the bracket 10 to the yoke portion of the member 34, and accordingly, the pin passes through the holes 72 in the upper and lower parts 66 and 68, as well as through the hole 53 in the attachment ear 52 of the associated angle leg. The pivot pins 36 are welded in position in the yoke portion 60 as indicated at 74. The hook portion 62 of the combined yoke and hook member 34 includes a base part 80 which lies in a plane substantially midway between the respective planes of the parts 66 and 68 of the yoke portion 60. The free end of the base part 80 is turned upwardly as at 82 (see FIG. 3) and has a short reentrant part 84 overlying the base part 80. The side edges of the reentrant part 84 are preferably tapered as shown at 86.

Reference to FIG. 2 will show that the two angle legs 30 and 32 of the bracket 10 are capable of swinging movement back and forth between positions of close proximity to each other as shown in full lines in this view and wherein the two vertical portions 37 thereof are contiguous or side-by-side, and positions of wide separation wherein these vertical portions 37 are spaced apart but remain parallel to each other and the horizontal portions 38 extend at a wide angle to each other. The two angle legs 30 and 32 are shown in this view in dotted lines as being disposed at an angle of 90° to each other for the purpose of accommodating placement against them of right angle load surfaces when certain objects of a rectangular nature are being tied down, as will be described in greater detail subsequently.

In the installation illustrated in FIG. 1, the two articulated tie-down load control brackets 10 are applied to the helically-wound sheet metal coil 12 at diametrically opposite regions of the coil. The horizontal portions 38 of the angle legs 30 and 32 overlie and rest upon the upper circular end face 18 of the coil 12, while the vertical portions 37 fit flatly against the cylindrical side surface of the coil. The horizontal portions 38 of each bracket extend at an acute angle to each other. The angle is not critical and may be of such small proportion that the two portions 38 extend substantially radially, or it may be of such large proportion that these portions 38 extend in secant planes which intersect along a vertical line somewhere between the axis of the coil and its cylindrical outer surface. Generally speaking, the larger the diameter of the coil, the wider will be the angle so that the coil may be gripped at relatively widely spaced regions on the cylindrical side surface thereof. The hook portions 62 of the combined yoke and hook members 34 of the two brackets 10 are connected together by a connecting chain in the form of a tensioned chain loop 89 which passes beneath the reentrant portions 84 of the hook portions, thus drawing the brackets 10 toward each other and causing the vertical portions 37 of the angle legs to be drawn tightly against the cylindrical surface of the oil. The coil is thus firmly gripped at four circumferentially spaced regions around the coil.

In the exemplary installation of FIG. 1, two tie-down chains 58 are employed. These chains are provided with the usual hooks 90 at the ends thereof. The hooks 90 are attached to suitable reaction brackets 92 on the sides of the platform 16, and the medial regions of the chains pass between the chain-receiving hooks 54 and the adjacent medial parts 39 of the vertical portions 37 of the angle legs of the brackets 10. Ordinarily, a relatively large number of the reaction brackets 92 will be provided in spaced relationship along the sides of the platform 16 so that by selective use of such brackets no tensioning means is required for the chains 58. However, if desired, the use of conventional chain-tensioning means may be resorted to. It is to be noted at this point that because of the fact that the distance between the hook finger 56 (see FIG. 3) of each hook 54 and the adjacent outside face of the medial part 39 is greater than the small thickness dimension of a chain link but less than the minor elliptical axis of the link, the associated chain may readily be slipped behind the hook finger, and when in position, it will not slide axially in the direction of chain extent. For these reasons, the tensional holding power of each chain is available to prevent side slipping of the load or any portion thereof when the chains are applied to the load as illustrated in FIG. 1.

Furthermore, because of the fact that the end regions of the chains are secured to reaction points which lie well below the horizontal level of the hooks 54, the chains exert a downward pull upon the brackets 10 and prevent tilting of the load in any direction. It is to be further noted that when the two chains are under tension, the cushioning strips 44 are drawn hard against the underlying surfaces of the load in such a manner that the concavities afforded by the recesses 50 in the strips produce suction cup effects which prevent circumferential shifting of the angle legs of the brackets. The cushioning strips 44 further absorb sudden shock, as well as afford protection to the load against denting or the like. Finally, the strips 44 prevent the effect of sudden shock from being transmitted to the chains so that chain life is materially prolonged.

In FIG. 6, four of the present articulated tie-down load control brackets 10 are shown in another environment wherein the load 100 is in the form of a rectangular blocklike object. The details of the vehicle 17 and the supporting pallet for the load 100 remain substantially the same as in the environment shown in FIG. 1 and, therefore, to avoid needless repetition of description, like characters of reference have been applied to the corresponding parts as between FIGS. 1 and 6.

The load 100 may be in the form of a stack of metal sheets which, considered as a whole, presents a horizontal rectangular top face 102, end faces 104, side faces 106 and a bottom face 108 which rests upon the platform-supported pallet. The four brackets 10 are shown as being in their collapsed condition, which is to say, that the two angle legs 30 and 32 of each bracket assume positions of parallelism and contiguity as shown in full lines in FIG. 2. Two of the brackets 10 overlie the forward upper edge 109 of the load, while the other two brackets overlie the rear upper edge 110 of the load much in the same manner that the two brackets 10 overlie the upper circular rim of the load 12 of FIG. 1. The hook portions 62 of longitudinally aligned pairs of the brackets are connected together by connecting chains in the form of chain loops 112, and tie-down chains 113 have their ends anchored to brackets on the sides of the platform and pass across the forward and rear end faces 104 respectively and are confined by the hooks 54 on the vertical portions 37 of angle legs of the brackets. The various chains and brackets function in the manner previously described in connection with the load 12 to retain the load 100 against movement in any direction.

The specific disposition of the four brackets 10 shown in FIG. 6 constitutes but one exemplary disposition thereof. If desired, other placements of the brackets may be resorted to and a greater or lesser number of the brackets may be employed. For example, the four brackets 10 may be disposed on the load 100 at the four upper corners thereof, in which case, the angle legs 30 and 32 may be disposed so that the horizontal portions 38 of the angle legs of each bracket extend at a right angle to each other. With the angle legs thus disposed, the vertical portion 37 of one angle leg may be caused to bear against a side face of the load, while the vertical portion 37 of the other angle leg may be caused to bear against an end face of the load. The chain loops 112 will, of course, then extend diagonally across the top face 102 of the load with the two loops crossing each other centrally of the top face. The tie-down chains 114 will then pass around the four vertical corners of the load and be protected entirely from contact with the load.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. An articulated tie-down load control bracket adapted for use with similar brackets to stabilize a load resting on a vehicle platform, said bracket comprising a combined yoke and hook member adapted to overlie the load and presenting a yoke portion and a hook portion, said hook portion being designed for reception thereover of a connecting chain whereby opposed brackets on the load may be connected together, a pair of angle legs each having a vertical portion having an inside edge adapted to bear against a side of the load and a horizontal portion having an inside edge adapted to bear against an upper surface of the load, said horizontal portions being pivoted at their ends to said yoke portion for relative swinging movements toward and away from each other between positions of parallelism and positions of wide angular divergence whereby the vertical portions are movable between positions of close proximity and positions of wide separation respectively, a chain hook on the vertical portion of each angle leg designed for reception thereover of a tie-down chain, and a relatively thick elastomeric cushioning strip coextensive with and secured to each angle leg and extending along the inside edges therof and designd for direct contact with said load.

2. An articulated tie-down load control bracket as set forth in claim 1 and wherein said cushioning strip is formed with an elongated continuous trough-like recess on the inside edge thereof.

3. An articulated tie-down load control bracket adapted for use with simliar brackets to stabilize a load resting by gravity upon a vehicle platform, said bracket including a pair of angles legs each having a horizontal portion the inside edge of which is adapted to bear downwardly against an upper horizontal surface of the load, and a vertical portion the inside edge of which is adapted to bear inwardly against a vertical outside surface of the load, a hook member including a base part and a reentrant hook proper, the free ends of said horizontal portions being pivoted to said base part at spaced regions whereby the horizontal portions are capable of relative swinging movement toward and away from each other between extreme positions of parallelism and positions of wide angular divergence, and whereby the vertical portions are movable between positions of close proximity to each other and positions of wide physical separation respectively, said hook proper being adapted to receive thereover a connecting chain whereby opposed brackets on the load may be connected together, and a chain hook on each of said vertical portions of the angle legs and designed for reception thereover of a tie-down chain.

4. An articulated tie-down load control bracket as set forth in claim 3 and including, additionally, a relatively thick elastomeric cushioning strip coextensive with and secured to each angle leg and extending along the inside edges of the horizontal and vertical members thereof, said cushioning strip being designed for direct contact with said load.

5. An articulated tie-down load control bracket adapted for use with similar brackets to stabilize a load resting by gravity upon a vehicle platform, said bracket including a pair of angle legs each having a horizontal portion the inside edge of which is adapted to bear downwardly against an upper horizontal surface of the load, and a vertical portion the inside edge of which is adapted to bear inwardly against a vertical outside surface of the load, a hook member including a base part and a reentrant hook proper, the free ends of said horizontal portions being pivoted to said base part at spaced regions whereby the horizontal portions are capable of relative swinging movement toward and away from each other between positions of parallelism and positions of wide angular divergence, and whereby the vertical portions are movable between positions of close proximity to each other and positions of wide physical separation respectivly, said hook proper being adapted to receive thereover a connecting chain whereby opposed brackets on the load may be connected together, a chain hook on each of said vertical portions of the angle legs and designed for reception thereover of a tie-down chain, the cross sectional shape of the horizontal and vertical portions of said angle legs being generally of concavo-convex configuration, and a relatively thick elastomeric cushioning strip coextensive with the inside concave edges of the horizontal and vertical portions of each angle leg and bonded thereto, said cushioning strip having a cross sectional shape which is generally of concavo-convex configuration.

No references cited.